United States Patent
Xu et al.

(10) Patent No.: US 12,236,196 B2
(45) Date of Patent: Feb. 25, 2025

(54) METHOD, ELECTRONIC DEVICE AND STORAGE MEDIUM FOR SEMANTIC PARSING

(71) Applicants: BEIJING XIAOMI MOBILE SOFTWARE CO., LTD., Beijing (CN); Beijing Xiaomi Pinecone Electronics Co., Ltd., Beijing (CN)

(72) Inventors: Dezhi Xu, Beijing (CN); Wen Dai, Beijing (CN); Yan Liu, Beijing (CN); Huiwen Liu, Beijing (CN); Shuai Chen, Beijing (CN)

(73) Assignees: BEIJING XIAOMI MOBILE SOFTWARE CO., LTD., Beijing (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 295 days.

(21) Appl. No.: 17/519,515

(22) Filed: Nov. 4, 2021

(65) Prior Publication Data
US 2022/0350972 A1 Nov. 3, 2022

(30) Foreign Application Priority Data
Apr. 29, 2021 (CN) .......................... 202110476311.5

(51) Int. Cl.
*G06F 40/30* (2020.01)
*G06F 40/205* (2020.01)
*G06F 40/295* (2020.01)

(52) U.S. Cl.
CPC ............ *G06F 40/30* (2020.01); *G06F 40/205* (2020.01); *G06F 40/295* (2020.01)

(58) Field of Classification Search
CPC ...... G06F 40/30; G06F 40/205; G06F 40/295; G06F 16/3329; G06F 40/247; G06N 3/044; G06N 3/08
See application file for complete search history.

(56) References Cited

U.S. PATENT DOCUMENTS 6,311,150 B1   10/2001   Ramaswamy et al.
6,701,313 B1 *   3/2004   Smith ................... G06F 16/289
(Continued)

FOREIGN PATENT DOCUMENTS

CN   103077236 B   11/2015
CN   108052659 A   5/2018
(Continued)

OTHER PUBLICATIONS

Fu, B., Qiu, Y., Tang, C., Li, Y., Yu, H., & Sun, J. (2020). A survey on complex question answering over knowledge base: Recent advances and challenges. arXiv preprint arXiv:2007.13069. (Year: 2020).*

(Continued)

*Primary Examiner* — Bhavesh M Mehta
*Assistant Examiner* — Philip H Lam
(74) *Attorney, Agent, or Firm* — Arch & Lake LLP; Hao Tan; Shen Wang (57) ABSTRACT

Methods, electronic device, and non-transitory computer-readable storage mediums are provided for semantic parsing. The equipment may obtain a first recognition result of a target statement. The first recognition result may include a first intention recognition result and a first entity recognition result. The first entity recognition result may correspond to a plurality of vertical domains. The equipment may also determine one of the plurality of vertical domains corresponding to the first entity recognition result as a target vertical domain corresponding to the target statement according to the first intention recognition result. The equipment may further convert the first entity recognition result into a second entity recognition result in the target vertical domain. The equipment may also parse an intention of the target statement according to the second entity recognition result.

11 Claims, 8 Drawing Sheets

(56) References Cited

U.S. PATENT DOCUMENTS

| | | | |
|---|---|---|---|
| 10,418,032 B1* | 9/2019 | Mohajer | G10L 15/1815 |
| 10,600,406 B1 | 3/2020 | Shapiro et al. | |
| 10,614,113 B2* | 4/2020 | Peled | G06F 16/93 |
| 2009/0006467 A1* | 1/2009 | Visscher | G06Q 10/06 |
| 2013/0006914 A1* | 1/2013 | Ray | G06F 16/9535 |
| | | | 707/738 |
| 2017/0177715 A1 | 6/2017 | Chang et al. | |
| 2017/0278514 A1* | 9/2017 | Mathias | G06F 16/35 |
| 2018/0314689 A1* | 11/2018 | Wang | G10L 15/1822 |
| 2020/0125992 A1* | 4/2020 | Agarwal | G06N 3/084 |
| 2020/0279555 A1* | 9/2020 | Shapiro | G10L 15/22 |
| 2020/0311167 A1* | 10/2020 | Barve | G06F 40/237 |
| 2020/0394194 A1* | 12/2020 | Glover | G06F 16/24553 |
| 2021/0125600 A1* | 4/2021 | Xu | G06F 40/205 |
| 2021/0383798 A1* | 12/2021 | Zhang | G06F 16/3329 |
| 2022/0188567 A1* | 6/2022 | Ganesan | G06N 3/02 |

FOREIGN PATENT DOCUMENTS

| | | | | |
|---|---|---|---|---|
| CN | 109241524 A | | 1/2019 | |
| CN | 107315772 B | | 8/2019 | |
| CN | 110597992 A | * | 12/2019 | G06F 16/35 |
| CN | 110704592 A | | 1/2020 | |
| CN | 111402888 A | | 7/2020 | |
| CN | 112115245 A | | 12/2020 | |
| WO | 2021073298 A1 | | 4/2021 | |
| WO | 2021076302 A1 | | 4/2021 | |

OTHER PUBLICATIONS

Liu, Y., Zhang, W., Yuan, Q., & Zhang, J. (2020). Research on Intelligent Question and Answering Based on a Pet Knowledge Map. International Journal of Networked and Distributed Computing, 8(3), 162-170. (Year: 2020).*

Ni, P., Li, Y., Li, G., & Chang, V. (2020). Natural language understanding approaches based on joint task of intent detection and slot filling for IoT voice interaction. Neural Computing and Applications, 32, 16149-16166. (Year: 2020).*

Ekbal, A., & Bandyopadhyay, S. (2010). Named entity recognition using support vector machine: A language independent approach. International journal of electrical and computer engineering, 4(3), 589-604. (Year: 2010).*

European Search Report of EP Application No. 21210108 dated May 10, 2022, (3p).

Zhang Zi-xuan, et el., "Construction and application of intelligent question and answering system for water conservancy information resources", College of Computer and Information, Hohai University, Nanjing 211100, China. (7p).

Dai Wen, Senior Algorithm Engineer at Xiaomi, "Xiaomi Xiaoai Intelligent Q&A System Overview", (3p).

Bin Fu et al.,Institute of Computing Technology, Chinese Academy of Sciences, Beijing, "A Survey on Complex Question Answering over Knowledge Base: Recent Advances and Challenges". arXiv:2007. 13069v1 [cs.CL] Jul. 26, 2020,(19p).

* cited by examiner

METHOD, ELECTRONIC DEVICE AND STORAGE MEDIUM FOR SEMANTIC PARSING

CROSS-REFERENCE TO RELATED APPLICATION

The present application is based on and claims priority to the Chinese Patent Application No. 202110476311.5, filed on Apr. 29, 2021, the entire contents of which are incorporated herein by reference.

TECHNICAL FIELD

The present disclosure relates to the field of parsing, and in particular, to a method and device for semantic parsing.

BACKGROUND

Semantic parsing refers to an automatic transformation of a natural language into a form of expression that can be understood and executed by a machine. Semantic parsing technology can be applied to many scenes such as searching and customer service. In a scene of intelligent voice interaction, a user query can be converted into a structured query statement through the semantic parsing technology to obtain answers from a knowledge base.

The results of semantic parsing can provide services for many downstream tasks to facilitate the downstream tasks to understand questions of a user, such as searching, customer service, and Q&A. Taking an intelligent Q&A system for example, the user raises a query, and after the query is sent to the Q&A system, an algorithm parses the query, then a structured query statement is obtained, and an answer is obtained from a knowledge graph and then returned to the user.

There usually exists a difficulty in data management, low parsing efficiency, and accuracy in the semantic parsing system due to the variable application scenarios, complicated received user statement and many different fields involved.

SUMMARY

The present disclosure provides methods, equipments, electronic devices and storage mediums for semantic parsing.

According to a first aspect of the present disclosure, a method and equipment for semantic parsing are provided. The equipment obtains a first recognition result of a target statement. The first recognition result may include a first intention recognition result and a first entity recognition result. The first entity recognition result may correspond to a plurality of vertical domains. The equipment may also determine one of the plurality of vertical domains corresponding to the first entity recognition result as a target vertical domain corresponding to the target statement according to the first intention recognition result. The equipment may further convert the first entity recognition result into a second entity recognition result in the target vertical domain. The equipment may also parse an intention of the target statement according to the second entity recognition result.

According to a second aspect of the present disclosure, an electronic device is provided. The electronic device may include one or more processors, a non-transitory computer-readable memory storing instructions executable by the one or more processors. The one or more processors may be configured to obtain a first recognition result of a target statement. The first recognition result may include a first intention recognition result and a first entity recognition result. The first entity recognition result may correspond to a plurality of vertical domains. The one or more processors may also be configured to determine one of the plurality of vertical domains corresponding to the first entity recognition result as a target vertical domain corresponding to the target statement according to the first intention recognition result. The one or more processors may also be configured to convert the first entity recognition result into a second entity recognition result in the target vertical domain. The one or more processors may also be configured to parse an intention of the target statement according to the second entity recognition result.

According to a third aspect of the present disclosure, a non-transitory computer-readable storage medium having stored therein instructions is provided, when the instructions are executed by the one or more processors of a mobile terminal, the mobile terminal may obtain a first recognition result of a target statement. The first recognition result may include a first intention recognition result and a first entity recognition result. The first entity recognition result may correspond to a plurality of vertical domains. The instructions may further cause the mobile terminal to determine one of the plurality of vertical domains corresponding to the first entity recognition result as a target vertical domain corresponding to the target statement according to the first intention recognition result. The instructions may further cause the mobile terminal to convert the first entity recognition result into a second entity recognition result in the target vertical domain. The instructions may further cause the mobile terminal to parse an intention of the target statement according to the second entity recognition result.

It should be understood that the above general description and the following detailed description are only examples and explanatory without limiting the present disclosure.

BRIEF DESCRIPTION OF THE DRAWINGS

Accompanying drawings here, which are incorporated in and constitute a part of this specification, illustrate examples consistent with the present disclosure and, together with the specification serve to explain principles of the present disclosure.

DETAILED DESCRIPTION

Examples of the present disclosure will be described here in details, whose examples are shown in accompanying drawings. Unless otherwise stated, same numbers in different drawings represent same or similar elements when the following description refers to the drawings. Implementations described in the following examples of the present disclosure do not cover all implementations consistent with the present disclosure. Rather, they are merely examples of an equipment and a method detailed in claims and consistent with some aspects of the present disclosure.

In order to meet increasing demands of a user, an intelligent Q&A system usually needs to cover various vertical domains, such as ancient poems, compositions and recipes. Each vertical domain has its own unique slots and needs to carry out repeated work for slot arrangement, sample labeling and model training, which will consume a large amount of labor and time cost. Besides, it is difficult to obtain labeled samples of some vertical domains, and the training of a semantic parsing model relies on the labeled samples, which will greatly reduce the training effect of the model, and then affect the accuracy of semantic parsing and intelligent Q&A.

As for semantic parsing, intention recognition and slot filling are two core tasks in semantic parsing. Through intention recognition and slot filling, a natural language may be transformed into a structured expression form. Intention recognition and slot filling mainly aim to judge explicit intentions in the natural language and slots corresponding to the intentions, for example, intentions in an ancient poem vertical domain include: contents of the ancient poems, dynasties of the ancient poems, upper verses and lower verses of the poems and meanings of the ancient poems, and slots include: names of the ancient poems, verses, poets and the dynasties. A query of the user may be parsed to an intention and one or more corresponding slots, and the information of the slots may be empty or may has one or more items. Parsed intention and slot information may be directly transmitted to a downstream module, and thus the downstream module may better understand the query of the user according to an application scenario. As such, the accuracy of intention recognition and slot filling directly determines the accuracy of an answer given by a system in response to a natural statement of the user.

For example, the query 'how to recite the quatrain from Tu Fu' shows an intention related to a specific ancient poem, and a plurality of slots related to the ancient poem are contained in the query. Intention recognition and slot filling parse this query into structured intention and slot information, to obtain that an intention of the user is to know the content of the quatrain, and the slot information contained is: poem name-quatrain, and poet-Tu Fu. Through the parsed intention and slot information, a structured query statement is generated: "SELECT*FROM poem WHERE name=quatrain AND poet=Tu Fu", so as to obtain the answer that meets the demands of the user.

It was found that in a process of using the intelligent Q&A system with a semantic parsing function, in order to meet increasing demands of the user, the intelligent Q&A system usually needs to cover various vertical domains, such as ancient poems, compositions and recipes. Each vertical domain has its own unique slots and needs to carry out repeated work of slot arrangement, sample labeling and model training, which will consume a large amount of labor and time cost. Besides, it is difficult to obtain labeled samples of some vertical domains, and the training of a semantic parsing model relies on the labeled samples, which will greatly reduce the training effect of the model, and then affect the accuracy of semantic parsing and intelligent Q&A.

In order to solve the above problems and improve on the technology, examples of the present disclosure provide a method and an equipment for semantic parsing, which realize an efficient and flexible intelligent voice solution by means of a processing method which firstly performs coarse-grained recognition at an upper level and then performs accurate parsing. A vertical domain likely to be hit is quickly determined through more coarse-grained fuzzy recognition, then analysis is performed further, thus a higher-accuracy final result is obtained, and the problem of affecting the semantic recognition efficiency and accuracy due to a complicated data structure is solved.

Figure 1:
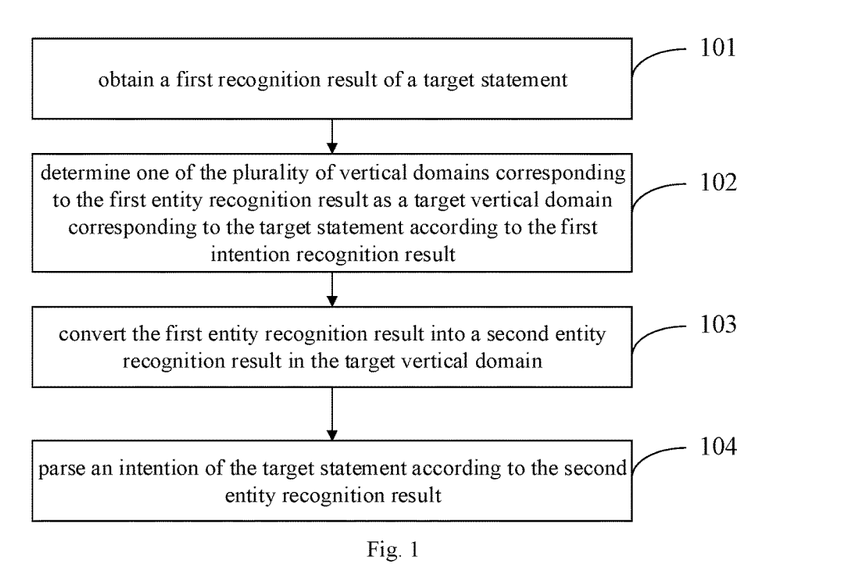
FIG. 1 is a flowchart of a semantic parsing method, according to one or more examples of the present disclosure.

An example of the present disclosure provides a semantic parsing method. A flow of semantic parsing through the method is shown in FIG. 1 and includes:

Step 101, a first recognition result of a target statement is obtained.

In the example, recognition at a coarse-grained level is performed on the target statement so as to obtain the first recognition result.

The first recognition result includes a first intention recognition result and a first entity recognition result, and the first entity recognition result corresponds to a plurality of vertical domains.

The first entity recognition result includes at least one first slot and corresponding slot information. Entity libraries related to second slots of all the vertical domains may be related to the first slot.

Fuzzy recognition may be performed, and the first recognition result is a fuzzy recognition result.

This step may be executed through a neural network. A first recognition model is obtained by training the neural network, and then the target statement is input into the first recognition model so that the first recognition result is obtained.

Step 102, one of a plurality of vertical domains corresponding to the first entity recognition result is determined as a target vertical domain corresponding to the target statement according to the first intention recognition result.

In this step, vertical domain recognition is performed according to the first intention recognition result, and a vertical domain matched with the first intention recognition result is selected from at least one possibly concerning vertical domain as the target vertical domain corresponding to the target statement.

The target vertical domain includes at least one second slot.

Step 103, the first entity recognition result is converted into a second entity recognition result in the target vertical domain.

In the example, a mapping relation exists between the first slots and the second slots. One of the first slots may be associated to the plurality of different second slots of different vertical domains, and each of the second slots is associated to one of the first slots.

In this step, the first entity recognition result is converted according to the association relationship between the first slots and the second slots. A first slot involved in the first entity recognition result is mapped to the second slots associated in the target vertical domain, and slot information of the first slot is given to the second slots.

Step 104, an intention of the target statement is parsed according to the second entity recognition result.

In this step, the intention of the target statement may be parsed according to the second entity recognition result and keywords of the target statement.

In some embodiment, in the target vertical domain, a more accurate intention of the target statement is determined in combination with keywords, namely, a specific intention in the target vertical domain.

At this point, the second entity recognition result and the intention of the target statement are obtained through complete parsing, and a foundation is provided for a downstream service task.

Figure 2:
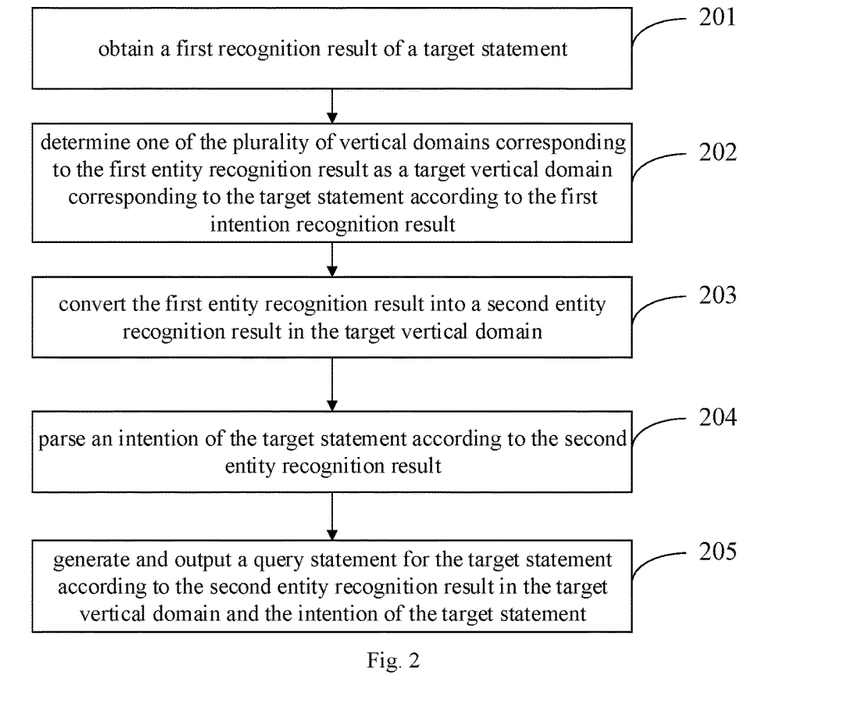
FIG. 2 is a flowchart of another semantic parsing method, according to one or more examples of the present disclosure.

An example of the present disclosure provides a semantic parsing method. Through the method, a downstream service may be triggered by using a parsed second entity recognition result and an intention in the target vertical domain. A flow is shown in FIG. 2.

Step 201 to step 204 are the same as step 101 to step 104 in FIG. 1, and will not be detailed here.

The downstream service may be started by using a semantic parsing result after the second entity recognition result and the intention for the target statement are obtained through complete parsing.

Step 205, a query statement for the target statement is generated and output according to the second entity recognition result in the target vertical domain and the intention of the target statement.

An example of the present disclosure further provides a semantic parsing method. A general system for semantic parsing at a coarse-grained level is established, and a plurality of different vertical domains are mapped into the general system. In this way, first-stage semantic parsing may be performed through the general system so as to obtain a coarse-grained first recognition result, then mapping of the first recognition result to the target vertical domain is performed so as to obtain a fine-grained final recognition result in the target vertical domain.

Figure 3:
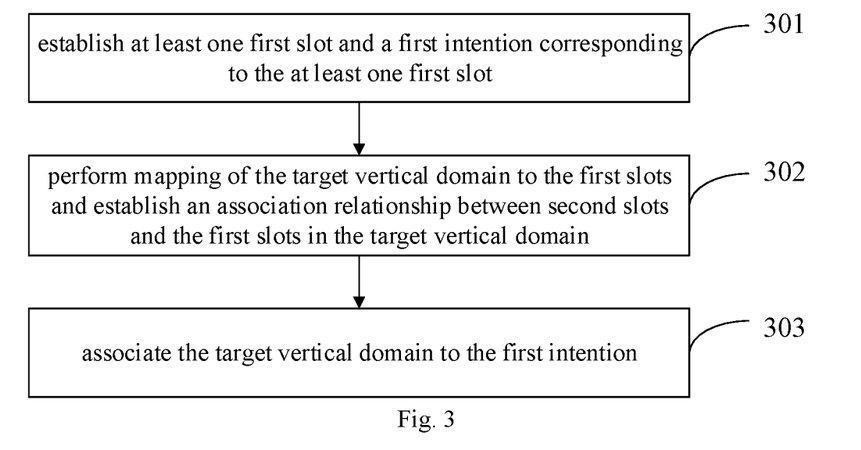
FIG. 3 is a flowchart of yet another semantic parsing method, according to one or more examples of the present disclosure.

A flow of establishing the general system by using the method is shown in FIG. 3 and includes:

Step 301, at least one first slot and a first intention corresponding to the at least one first slot are established.

In this step, based on commonality of part of the second slots in all the vertical domains, at least one first slot is established, so that the plurality of different second slots in the different vertical domains may be mapped onto one first slot, and integrating management is performed on the plurality of vertical domains so that semantic parsing recognition may be performed in a coarse-grained system of the first slot and the first intention.

Step 302, mapping of the target vertical domain to the first slot is performed, and an association relationship between the second slots and the first slots is established in the target vertical domain.

In this step, through mapping, each of the second slots of the target vertical domain corresponds to one first slot, and each of the first slots corresponds to at least one of the second slots.

In some embodiment, mapping of the plurality of vertical domains including the target vertical domain to a first slot system may be performed. In this way, ordinary entities related to the plurality of second slots are integrated into one entity set corresponding to the first slots through slot mapping. A plurality of intentions included in one vertical domain are integrated through mapping like this to form a first intention pointing toward the vertical domain.

The total quantity of the first slots is smaller than or equal to that of the second slots in any vertical domain.

As for a newly added vertical domain, a slot system, labeled data and a trained model generally need to be re-defined, which will cause long updating period, high data labeling cost, some fuzzy boundaries between different vertical domains and other problems. Fusing different vertical domains into the general system and training the model with fused data make it easier to obtain training samples (existing vertical domains and associated entity libraries may become training samples of the general system through mapping).

In some embodiment, a cross-vertical domain coarse-grained entity set may be obtained in combination with a concept graph, so that entities of different vertical domains have a unified expression form, for example, 'composition' and 'ancient poem' are forms of literature works and can be uniformly mapped into a first slot of workType, and 'Mao Zedong' and 'Li Bai' are persons and may be uniformly mapped into a first slot of person. Intentions of all the vertical domains are integrated to form a coarse-grained fuzzy intention.

When predicting an intention of a user, a specific intention is not predicted anymore, a vertical domain to which the intention belongs is predicted, and thus a more coarse-grained classification result is obtained. For example, a plurality of fine-grained specific intentions such as a recipe cooking method, preparation time and processing method in a recipe vertical domain may be uniformly expressed in a fuzzy intention of recipe. This reduces the types of intentions needing to be output from a model, reduces the complexity of the model, and meanwhile minimizes the mutual influence between different types of data (including different types of data in the same vertical domain and data in different vertical domains). When a new vertical domain is added, only an extra classification needs to be added, only unique slots of the vertical domain need to be added, the existing first slot which the vertical domain can utilize can be reused, and influence caused by cold start is effectively reduced. Besides, this coarse-grained data expression method may effectively solve the problem of data imbalance possibly existing in samples.

Table 1 is an example of a mapping relation between the first slots and entities obtained after mapping of the plurality of vertical domains to the first slots on the basis of the concept graph.

TABLE 1

| slot | name | example | description |
|---|---|---|---|
| person | person | Li Bai, Mao Zedong, Wang Yibo | It means a person in a query |
| content | content | Moonlight in front of the bed, You ask me how deep I love you | Specific contents of poems, lyrics, actor's lines and the like |
| tag | tag | Spring, Hardworking, Mountains and rivers of the motherland | For example, ancient poems concerning spring, idioms expressing happiness, composition of depiction of scenery |
| work | work | Jing Ye Si, Composition of my father, Yu-Shiang Shredded Pork | Poetry, titles of compositions, Names of dishes and the like |
| workType | Work type | Poem, Lyrics, Song, Quatrain, Modern poetry, Expository writing, Prose, Composition | Types of literature works |
| cp | Resource party | Tik Tok, Baby bus, TTsing | Name of Content Provider |
| dynasty | dynasty | Tang, Song, Han, Northern Song | Historical dynasties of China |
| grade | grade | First grade, Third grade | Grade limits in stories and compositions |
| number | number | One hundred, three hundreds | Quantity in a query: a composition with eight hundred words |

Taking three vertical domains of ancient poem, recipe and composition for example. In a fine-grained labeling system, each vertical domain includes a plurality of fine-grained intentions. The poem vertical domain may include: upper verses and lower verses of a poem, meaning, poet of poem, dynasty of poem and other intentions; the recipe vertical domain may include: cooking time, cooking method, style of cooking, needed raw materials and other intentions; and the composition vertical domain may include: searching for compositions according to labels, searching for compositions according to names and other intentions. In the coarse-grained general system used in the present disclosure, the specific intentions of each of the vertical domains are replaced by the vertical domains to which they belong, namely, a plurality of optional intentions are generalized/combined in generic terms within the range of vertical domain to obtain a fuzzy intention of the three classifications of ancient poem, recipe and composition. As for slots, in the fine-grained labeling system, the slots of each of the vertical domains are independent, but there are intersections between the vertical domains, resulting in two slots that belong to different vertical domains but have the same or similar attributes have different labels/names. The slots in the ancient poem vertical domain include name of a poem, verse, poet, dynasty, poemTag, poem Type and the like. The slots in the composition vertical domain include title of composition, compositionTag, compositionType, grade and the like. The slots in the recipe vertical domain include name of recipe, style of recipe, and the like. In the coarse-grained general system provided by the example of the present disclosure, these slots are used as the second slots, these second slots are integrated by using a generic concept 'first slot' of the slots, and the second slots of all the vertical domains are processed uniformly. For example, in 'which poems belong to Mao Zedong', a second slot to which 'Mao Zedong' corresponds in the ancient poem vertical domain is poet, namely, poet='Mao Zedong', but the corresponding second slots are not poet in the other vertical domains. However, all entities/second slots have generic word "person", thus a more generic concept is adopted in the example of the present disclosure to define this type of second slots as first slot "person". Accordingly, there is no influence between the slots of all the vertical domains, and the slots which have the same or similar attributes may be referred to one another, increasing the quantity of items of labeled data.

Table 2 is a comparison of the quantity of intention classifications and the quantity of the slots between the fine-grained second slots and the coarse-fined first slots. Under the condition of using the first slots, the quantity of the intentions needing to be classified is greatly reduced from 20 to 3. The quantity of the slots is also remarkably reduced due to the adoption of the more generic concept, part of the second slots are merged into the first slot, and the quantity of the slots is reduced from 17 to 10. Not only the data labeling difficulty is lowered, but also the complexity of the model is effectively lowered.

TABLE 2

|  | The quantity of intentions | The quantity of slots |
|---|---|---|
| Fine-grained second slot system | 20 | 17 |
| Coarse-grained first slot system | 3 | 10 |

Step 303, the target vertical domain is associated to the first intention.

In this step, the target vertical domain is associated to the first intention.

In some embodiment, the plurality of vertical domains mapped to the same general system are associated to the first intention.

In some embodiment, a plurality of first intentions are defined, each of the first intentions may point to one or more vertical domains. After the first intentions are determined, the target vertical domain can be determined according to the vertical domains to which the first intentions point.

An example of the present disclosure further provides a semantic parsing method. A task based on deep learning usually needs a large amount of data support, and the problem of data is always a key factor that limits the effect of a model. When a new vertical domain is added, as there are fewer accumulations, poor diversity, large manual labeling workload and the like, data of the newly added vertical domain usually hardly meet the training of the model, resulting in great limitation of model training.

Figure 4:
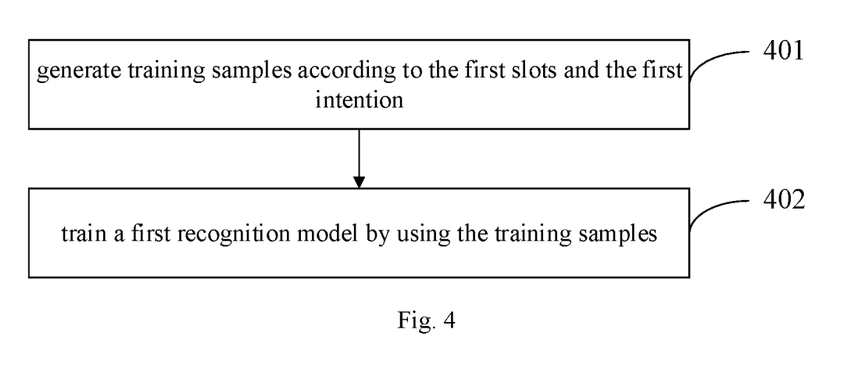
FIG. 4 is a flowchart of yet another semantic parsing method, according to one or more examples of the present disclosure.

According to the method provided by the example of the present disclosure, data classified based on first slots can be used as training samples, and a model for fuzzy recognition is obtained through training. A specific flow is shown in FIG. 4 and includes:

Step 401, the training samples are generated according to the first slots.

The training samples include positive samples and negative samples of the target vertical domain.

For example, 10,000 positive samples and 10,000 negative samples are prepared, and data labeling is performed on the training samples according to a coarse-grained fuzzy intention and the first slots. The positive samples are samples belonging to the target vertical domain, a plurality of different types are included in the positive samples, and the negative samples are samples which do not belong to the target vertical domain.

Model training needs a large amount of labeled data so as to obtain the training samples. Early-stage data may be labeled manually based on the coarse-grained first slots. In some embodiment, intentions of the data are labeled as a vertical domain to which a query belongs, a labeling mode of a named entity is a BIO labeling mode, B represents a first character of an entity, I represents other portions of the entity, and O represents a non-entity character. For example, as for a query "Jing Ye Si of Li Bai", its intention is an ancient poem in a general system, slots are labeled as B-person I-person O B-content I-conten I-content, and thus a complete piece of labeled data may be obtained.

As for the negative samples, all the intentions are labeled as null, so that data distribution is closer to the distribution of real data, and it is guaranteed that the model does not recall a query irrelevant to the target vertical domain. The negative samples may be still labeled according to the first slots in the coarse-grained general system, so as to maximize the utilization of data, obtain more labeled data as the training samples, and improve the model accuracy.

A data structure of the training samples obtained through cross-vertical domain slot labeling based on concept graph is simpler, and labeled data of different vertical domains may be shared without causing ambiguity. In this way, the influence of data intersection between different vertical domains is effectively reduced, the model can be better fitted to these coarse-grained labeled data, and the accuracy is higher.

Step 402, a first recognition model is trained by using the training samples.

In this step, by using the training samples, the first recognition model of fuzzy intention recognition and first slot extraction can be trained based on a two-way long short term memory (LSTM) network.

Figure 5:
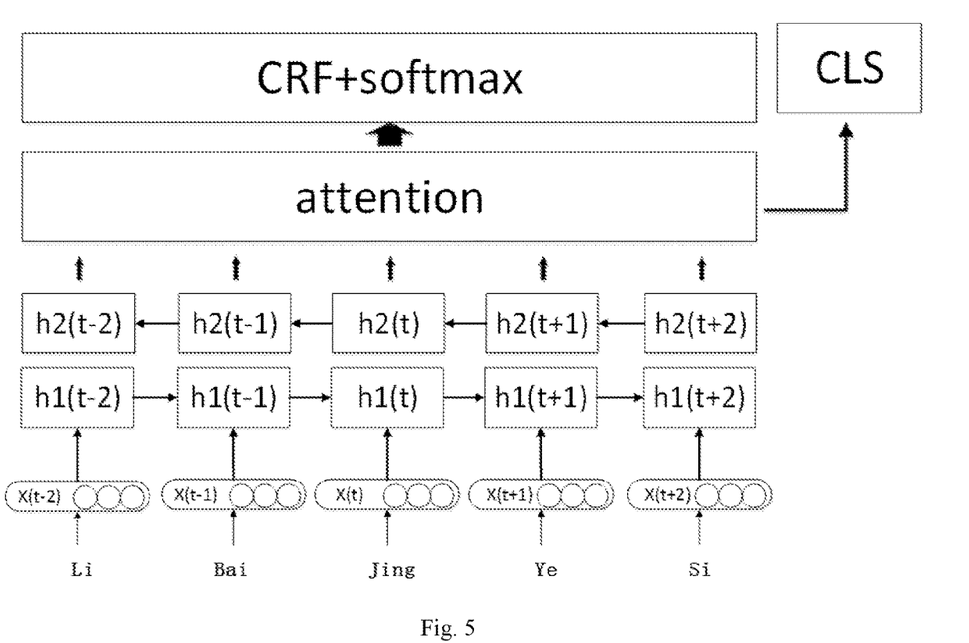
FIG. 5 is a schematic diagram of a principle of a first recognition model, according to one or more examples of the present disclosure.

As for data labeled according to the coarse-grained first slots, the network can be better fitted to the data. The network includes an input layer, a two-way LSTM, an attention layer and an output layer. For example, the input layer converts input characters to a vector through vector mapping (embedding), and a dimension of the vector is 128. Context information can be better captured through the two-way LSTM, and a vector dimension of its hidden layer may be set to be 256. An attention mechanism may make the model further focus on certain keywords in the query, improving the parsing capacity of the model for the query. The output layer includes two portions, one portion is for outputting an intention type (namely, a fuzzy recognition intention), and the other portion is for outputting a named entity recognition result (namely, a coarse-grained first entity recognition result) in combination with CRF. Joint training may organically combine the two tasks, intention recognition and named entity recognition in fuzzy recognition can share semantic information, intention recognition and named entity recognition may be mutually influenced and promoted in a training process, and together provide gradient information for the model, and a relation between intentions and entities is better explored. For example, in the training process, the following are set: max_seq_length=32, batch_size=32, learning_rate=5e−4; and a model structure is shown in FIG. 5.

A multilayer bidirectional Transformer encoder (Bert) network based on fine tuning may be also adopted.

In order to further improve the parsing capacity of the first recognition model for queries of different vertical domains, the generalization capability of a deep learning model may be utilized in the example of the present disclosure, a recognition result of the first recognition model is collected, and the recognition result is added into the training samples.

In some embodiment, queries recalled by the existing first recognition model are collected continuously, labeled data in the coarse-grained general system may be obtained according to the above-mentioned method, and queries already included in the training samples are removed, thus a large amount of parsed data of the first recognition model may be obtained through a small amount of labeled data, and the problem that the training sample data are difficult to obtain is effectively solved. Training the iterative model by using the new data obtained through recalling and the existing training samples initially prepared can not only improve the parsing capacity of the model, but also continuously accumulate businesses-related data.

Figure 6:
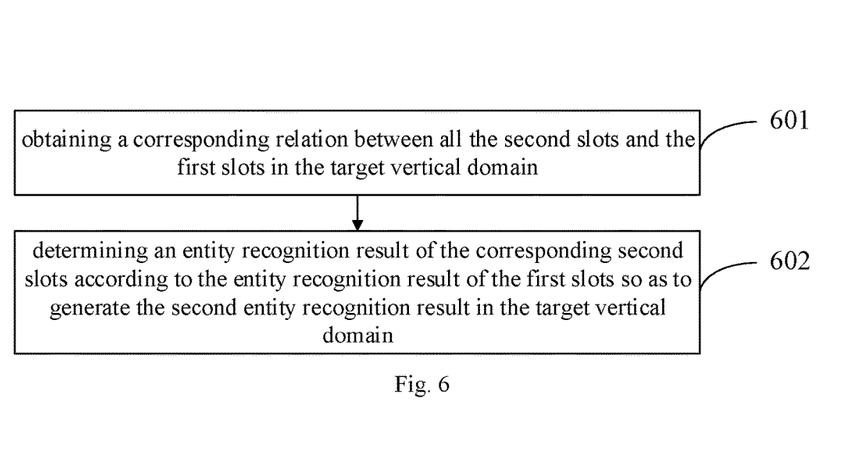
FIG. 6 is a flowchart of yet another semantic parsing method, according to one or more examples of the present disclosure.

An example of the present disclosure further provides a semantic parsing method. After a first recognition result is obtained based on a coarse-grained general system provided by the present disclosure, a flow of obtaining a second entity recognition result in a target vertical domain according to the first recognition result is shown in FIG. 6 and includes:

Step 601, a corresponding relation of all second slots and first slots in the target vertical domain is obtained.

TABLE 3

| Vertical domain to which it belongs | First slot | Second slot | Entity example contained in slot information |
|---|---|---|---|
| Ancient poem | content | verse | Moonlight in front of the bed |
|  | work | poem | Jing Ye Si |
|  | workType | poemType | Ancient, Lyrics, Modern poem |
|  | person | poet | Li Bai, Tu Fu |
|  | tag | poemTag | Poems for eulogizing motherland |
|  | grade | grade | Third grade |
| Composition | tag | compositionTag | Composition of depiction of scenery |
|  | workType | compositionType | Composition, Writings in classical style, speech draft |
|  | work | composition | Composition entitled My Father |
|  | number | number | Three hundred words, eight hundred words |
|  | school | grade | Composition of a primary school |

TABLE 3-continued

| Vertical domain to which it belongs | First slot | Second slot | Entity example contained in slot information |
|---|---|---|---|
| Recipe | work tag | name style | Yu-Shiang Shredded Pork Sichuan cuisine, Guangdong cuisine |

In this step, according to a pre-defined mapping rule in Table 3, a coarse-grained first recognition result is mapped to information of fine-grained optional intentions and second slots in a target vertical domain.

As the output obtained by the first recognition model is a relatively coarse-grained first recognition result which cannot be directly provided to the downstream task for further processing, the first recognition result needs to be further parsed.

The outputs of the first intention recognition result of intention recognition and the first entity recognition result of named entity recognition are combined, parsed and mapped to fine-grained entity recognition result for second slots and fine-grained intentions adapted to the target vertical domain.

In this step, second slots corresponding to the first slots in the target vertical domain are determined according to an association relationship between the first slots and the second slots.

Step 602, an entity recognition result of the corresponding second slots is determined according to an entity recognition result of the first slots so as to generate a second entity recognition result in the target vertical domain.

After the second slots are determined, entity information of the first slots may be mapped into the second slots.

Taking Table 3 for example, an output result of the model is obtained firstly, take 'a poem on autumn by Li Bai' as example, an output of the fuzzy intention is 'ancient poem', and the first entity recognition result is: person='Li Bai', tag='autumn', workType='ancient poem', and person, tag and workType are labels of the first slots. Then after it is determined that the target vertical domain is 'ancient poem' according to the fuzzy intention, in combination with the mapping relation in Table 3, the first entity recognition result is mapped to the second slots in the ancient poem vertical domain, person will be mapped as a second slot of poet, tag will be mapped as a second slot of poemTag, and thus coarse-grained first slots are mapped as fine-grained second slots. Then specific intentions are determined through the fine-grained second slots. In the 'ancient poem' vertical domain, a real intention corresponding to the query 'a poem on autumn by Li Bai' may be determined in combination with the fine-grained second slots and some keywords in the query of the user, this intention means that the user hopes to obtain an ancient poem written by a poet according to a certain label, so that a parsing result which can be used for the downstream task is obtained. In an intelligent Q&A system, a query statement may be generated according to this intention and entity information of the second slots, and a final answer is output.

As such, a coarse-grained model result is converted into fine-grained intention and slot information which is directly provided for the downstream task. The conversion accuracy of this converting process is quite high, and under the condition of accurate model parsing, the specific intentions of the user and real slot information may be obtained through accurate parsing according to a coarse-grained result. Thus, accuracy of the whole system only depends on model accuracy, and loss caused by subsequent parsing hardly occurs.

Figure 7:
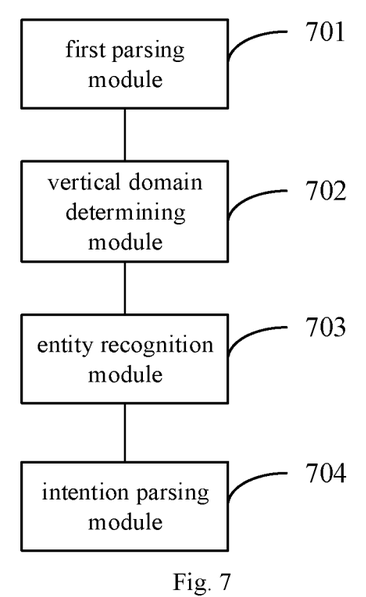
FIG. 7 is a block diagram of an equipment for semantic parsing, according to one or more examples of the present disclosure.

An example of the present disclosure further provides an equipment for semantic parsing, whose structure is shown in FIG. 7 and including:
- a first parsing module 701, configured to obtain a first recognition result of a target statement, the first recognition result includes a first intention recognition result and a first entity recognition result, and the first entity recognition result corresponds to a plurality of vertical domains;
- a vertical domain determining module 702, configured to determine one of the plurality of vertical domains corresponding to the first entity recognition result as a target vertical domain corresponding to the target statement according to the first intention recognition result;
- an entity recognition module 703, configured to convert the first entity recognition result into a second entity recognition result in the target vertical domain; and
- an intention parsing module 704, configured to parse an intention of the target statement according to the second entity recognition result.

Figure 8:
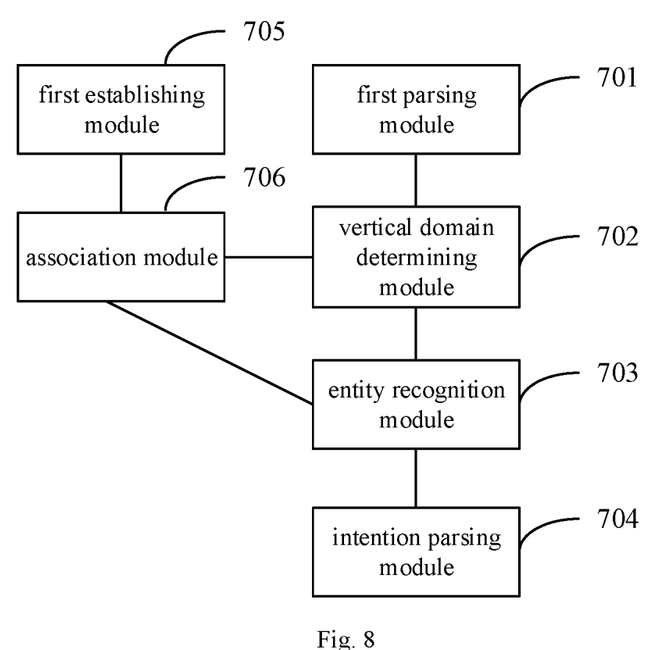
FIG. 8 is a block diagram of another equipment for semantic parsing, according to one or more examples of the present disclosure.

In some embodiment, the structure of the equipment is shown in FIG. 8 and further includes:
- a first establishing module 705, configured to establish at least one first slot and a first intention corresponding to the at least one first slot; and
- an association module 706, configured to perform mapping of the target vertical domain to the first slots and establish an association relationship between the second slots and the first slots in the target vertical domain, each of the second slots corresponds to one first slot, each of the first slots corresponds to at least one second slot, and the total quantity of the first slots is smaller than or equal to that of the second slots, and
- associate the target vertical domain to the first intention.

Figure 9:
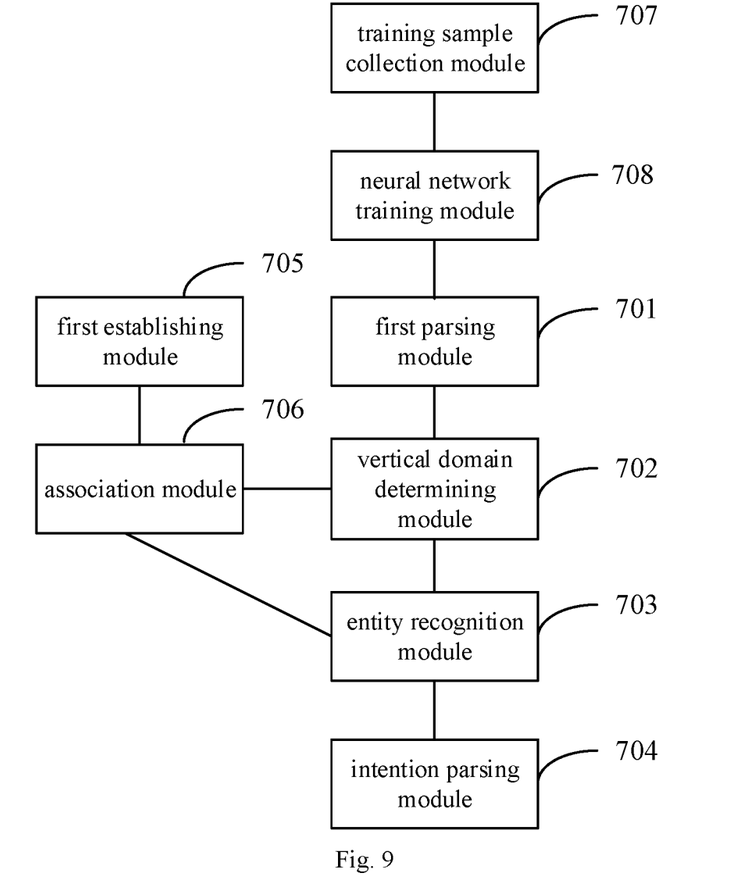
FIG. 9 is a block diagram of yet another equipment for semantic parsing, according to one or more examples of the present disclosure.

In some embodiment, the structure of the equipment is shown in FIG. 9 and further includes:
- a training sample collection module 707, configured to generate training samples according to the first slots, the training samples contain positive samples and negative samples of the target vertical domain; and
- a neural network training module 708, configured to train a first recognition model by using the training samples.

Figure 10:
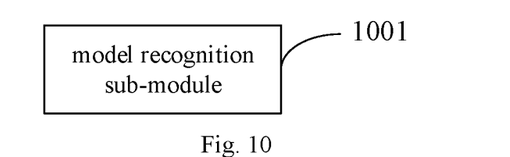
FIG. 10 is a block diagram of a first parsing module, according to one or more examples of the present disclosure.

In some embodiment, a structure of the first parsing module 701 is shown in FIG. 10 and includes:
- a model recognition sub-module 1001, configured to input the target statement into the first recognition model so as to obtain the first recognition result.

In some embodiment, the training sample collection module 707 is further configured to collect a recognition result of the first recognition model and add the recognition result into the training samples.

Figure 11:
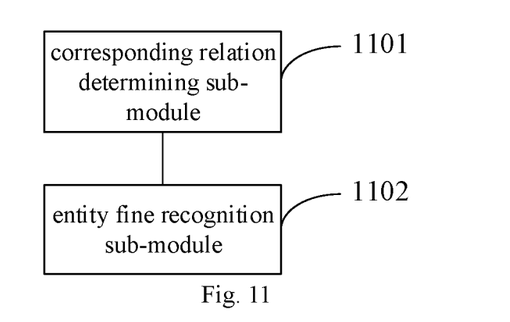
FIG. 11 is a block diagram of an entity recognition module, according to one or more examples of the present disclosure.

In some embodiment, the first entity recognition result contains an entity recognition result of at least one first slot, and a structure of the entity recognition result 703 is shown in FIG. 11 and includes:
- a corresponding relation determining sub-module 1101, configured to obtain a corresponding relation between all the second slots and the first slots in the target vertical domain; and
- an entity fine recognition sub-module 1102, configured to determine an entity recognition result of the corresponding second slots according to the entity recognition result of the first slots so as to generate the second entity recognition result in the target vertical domain.

Figure 12:
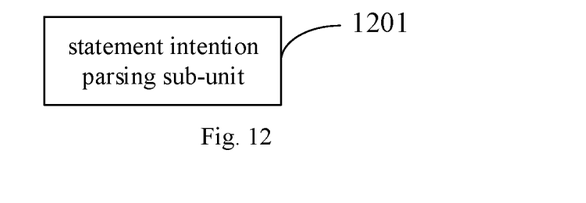
FIG. 12 is a block diagram of an intention parsing module, according to one or more examples of the present disclosure.

In some embodiment, a structure of the intention parsing module 704 is shown in FIG. 12 and includes:
- a statement intention parsing sub-unit 1201, configured to parse an intention of the target statement according to the second entity recognition result and keywords of the target statement.

Figure 13:
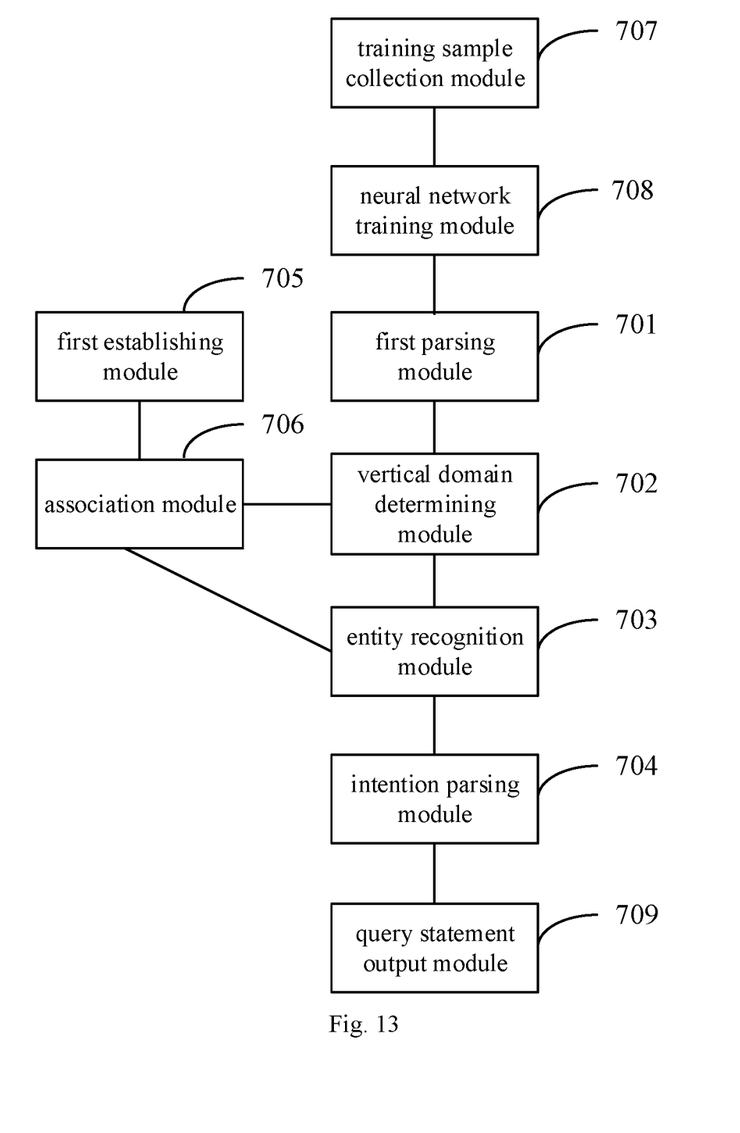
FIG. 13 is a block diagram of yet another equipment for semantic parsing, according to one or more examples of the present disclosure.

In some embodiment, the structure of the equipment is shown in FIG. 13 and further includes:
- a query statement output module 709, configured to generate and output a query statement for the target statement according to the second entity recognition result in the target vertical domain and the intention of the target statement.

All function modules of the equipment may be integrated into an intelligent device or a remote processing platform such as a server, or some function modules may be integrated into the intelligent device, and the other function modules are integrated into the remote processing platform. As for the equipment in the above example of the present disclosure, specific modes of executing operations by all the modules have been already detailed in the example of the present disclosure concerning the method and will not be detailed herein.

Figure 14:
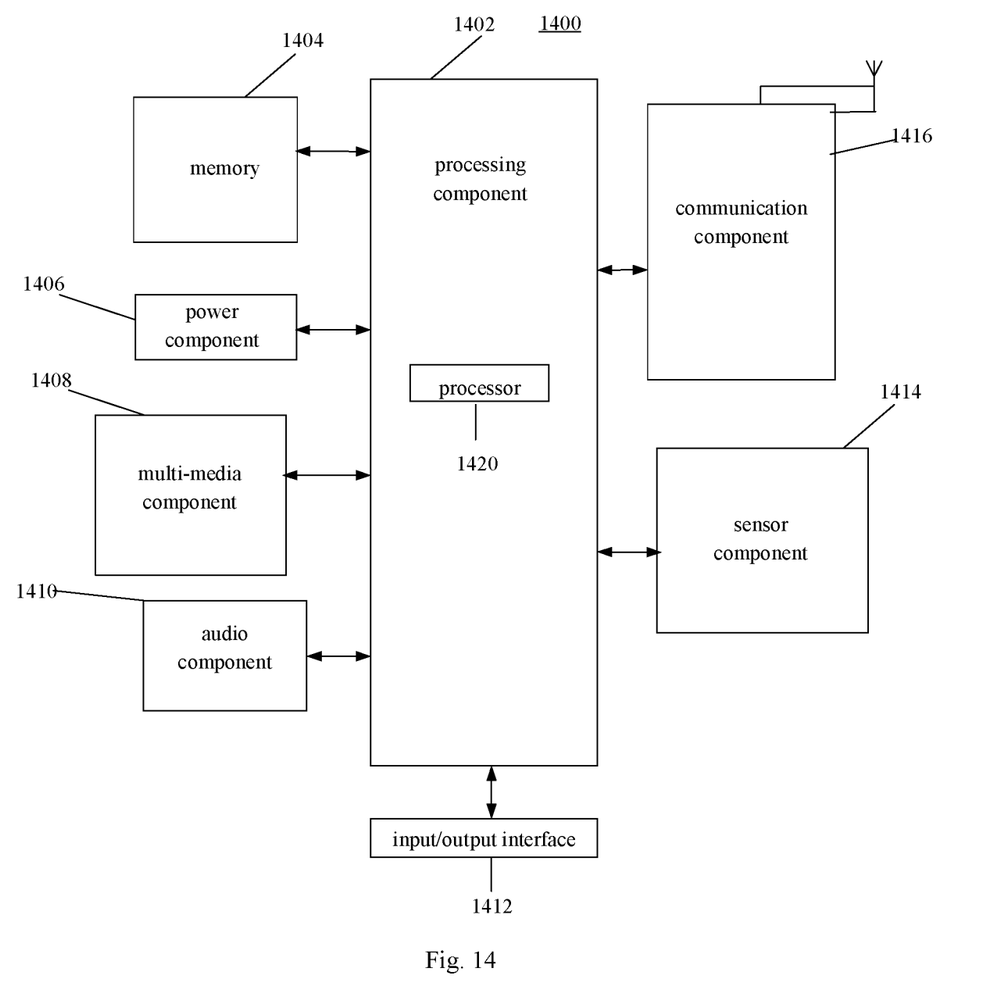
FIG. 14 is a block diagram of an electronic device, according to one or more examples of the present disclosure.

FIG. 14 is a block diagram of an electronic device for semantic parsing 1400 according to an example of the present disclosure. For example, the electronic device 1400 may be a mobile phone, a computer, a digital broadcast terminal, a messaging device, a gaming console, a tablet, a medical device, exercise equipment, a personal digital assistant and the like.

Referring to FIG. 14, the electronic device 1400 may include the following one or more components: a processing component 1402, a memory 1404, a power component 1406, a multi-media component 1408, an audio component 1410, an input/output (I/O) interface 1412, a sensor component 1414 and a communication component 1416.

The processing component 1402 usually controls whole operation of the electronic device 1400, such as operations related to display, phone call, data communication, camera operation and recording operation. The processing component 1402 may include one or more processors 1420 to execute instructions so as to complete all or part of the steps of the above method. Besides, the processing component 1402 may include one or more modules for convenient interaction between the processing component 1402 and the other components. For example, the processing component 1402 may include a multi-media module so as to facilitate interaction between the multi-media component 1408 and the processing component 1402.

The memory 1404 is configured to store various data so as to support operations on the electronic device 1400. Examples of these data include instructions of any application program or method for operation on the electronic device 1400, contact person data, telephone directory data, messages, pictures, videos and the like. The memory 1404 may be achieved by means of any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 1406 provides power for all the components of the electronic device 1400. The power component 1406 may include a power source management system, one or more power sources, and other components related to power generation, management and distribution for the electronic device 1400.

The multi-media component 1408 includes a screen for providing an output interface between the electronic device and a user. In some embodiments, the screen may include a liquid crystal display (LCD) and a touch panel (TP). If the screen includes the touch panel, the screen may be a touch screen so as to receive input signals from the user. The touch panel includes one or more touch sensors so as to sense touching, swiping and gestures on the touch panel. The touch sensors may sense a boundary of touching or a swiping action and also detect duration and pressure relevant to touching or swiping operation. In some embodiments, the multi-media component 1408 includes a front camera and/or a rear camera. When the electronic device 1400 is in an operation mode, such as a shooting mode or a video mode, the front camera and/or the rear camera may receive external multi-media data. Each front camera and rear camera may be a fixed optical lens system or have a focal length and an optical zoom capability.

The audio component 1410 is configured to output and/or input an audio signal. For example, the audio component 1410 includes a microphone (MIC). When the electronic device 1400 is in the operation mode, such as a calling mode, a recording mode and a voice recognition mode, the microphone is configured to receive an external audio signal. The received audio signal may be further stored in the memory 1404 or transmitted through the communication component 1416. In some embodiments, the audio component 1410 further includes a loudspeaker configured to output the audio signal.

The I/O interface 1412 provides an interface between the processing component 1402 and a peripheral interface module. The peripheral interface module may be a keyboard, a click wheel, buttons and the like. These buttons may include but are not limited to: a home button, a volume button, a start button and a lock button.

The sensor component 1414 includes one or more sensors, configured to provide state evaluation of all aspects for the electronic device 1400. For example, the sensor component 1414 may detect start/stop state of the electronic device 1400 and relative positioning of the components, for example, the components are a display and a keypad of the electronic device 1400. The sensor component 1414 may detect position change of the electronic device 1400 or one component of the electronic device 1400, whether there is touching between the user and the electronic device 1400, azimuth or acceleration/deceleration and temperature change of the electronic device 1400. The sensor component 1414 may include a proximity sensor configured to detect existence of objects nearby without any physical contact. The sensor component 1414 may further include an optical sensor, such as a CMOS or CCD image sensor, configured to be used in imaging application. In some embodiments, the sensor component 1414 may further include an acceleration sensor, a gyroscope sensor, a magnetic sensor, a pressure sensor or a temperature sensor.

The communication component 1416 may be configured to facilitate wired or wireless communication between the electronic device 1400 and other devices. The device 1400 may be accessed to a wireless network based on a communication standard, such as WiFi, 2G or 3G, or their combination. In an example of the present disclosure, the communication component 1416 receives a broadcast signal or relevant broadcast information from an external broadcast management system through a broadcast channel. In an example of the present disclosure, the communication component 1416 may further include a near-field communication (NFC) module so as to promote short-distance communication. For example, the NFC module may be achieved on the basis of a radio frequency identification (RFID) technology, an infrared data association (IrDA) technology, an ultra wide band (UWB) technology, a Bluetooth (BT) technology and other technologies.

In an example of the present disclosure, the electronic device 1400 may be achieved by one or more application specific integrated circuits (ASICs), a digital signal processor (DSP), a digital signal processing device (DSPD), a programmable logic device (PLD), a field programmable gate array (FPGA), a controller, a microcontroller, a microprocessor or other electronic elements for executing the above method.

In an example of the present disclosure, the present disclosure further provides a non-temporary computer readable storage medium including instructions, such as a memory 1404 including the instructions. The instructions may be executed by a processor 1420 of the electronic device 1400 so as to complete the above method. For example, the non-temporary computer readable storage medium may be an ROM, a random access memory (RAM), a CD-ROM, a magnetic tape, a floppy disk, an optical data storage device, and the like.

As for a non-temporary computer readable storage medium, when instructions in the storage medium are executed by a processor of a mobile terminal, the mobile terminal can execute a semantic parsing method, and the method includes:

a first recognition result of a target statement is obtained, the first recognition result includes a first intention recognition result and a first entity recognition result, and the first entity recognition result corresponds to a plurality of vertical domains;

one of the plurality of vertical domains corresponding to the first entity recognition result is determined as a target vertical domain corresponding to the target statement according to the first intention recognition result;

the first entity recognition result is converted into a second entity recognition result in the target vertical domain; and an intention of the target statement is parsed according to the second entity recognition result.

Figure 15:
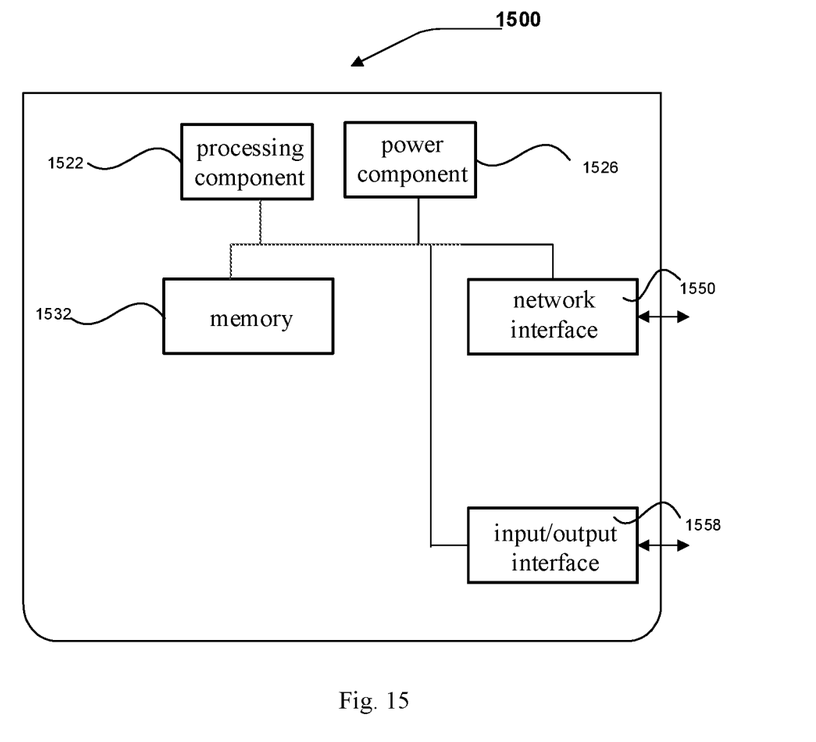
FIG. 15 is a block diagram of an electronic device, according to one or more examples of the present disclosure.

FIG. 15 is a block diagram of an electronic device for semantic parsing 1500 according to an example of the present disclosure. For example, the electronic device 1500 may be a server. Referring to FIG. 15, the electronic device 1500 includes a processing component 1522 and further includes one or more processors, and a memory resource represented by a memory 1532 for storing instructions capable of being executed by the processing component 1522, such as an application program. The application program stored in the memory 1532 may include one or more modules each of which corresponds to one group of instructions. Besides, the processing component 1522 is configured to execute the instructions so as to execute the above method.

The electronic device 1500 may further include a power component 1526 configured to execute power source management of the electronic device 1500, a wired or wireless network interface 1550 configured to connect the electronic device 1500 to a network, and an input/output (I/O) interface 1558. The electronic device 1500 may operate an operation system stored in the memory 1532, such as Windows Server™, Mac OS X™, Unix™, Linux, FreeBSD™ or likeness.

The present disclosure provides the method, the equipment and the electronic device for semantic parsing. Firstly, the first recognition result of the target statement is obtained, the first recognition result includes the first intention recognition result and the first entity recognition result, and the first entity recognition result corresponds to at least one vertical domain, so that the first intention recognition result is a generic coarse-grained result covering various specific entity recognition results; then one of the at least one vertical domain corresponding to the first entity recognition result is determined as the target vertical domain corresponding to the target statement according to the first intention recognition result; the first entity recognition result is converted into the second entity recognition result in the target vertical domain; and the intention of the target statement is parsed according to the second entity recognition result. Through more coarse-grained fuzzy recognition, data are more concise, data management and utilization are more efficient, and the problem that low recognition efficiency affects the accuracy of the intelligent voice Q&A is solved.

A technical improvement provided by the present disclosure has better generalization and higher recall capability for middle-long queries, does not need manual template supplement, enriches the training samples, and thus improves the recognition accuracy of the first recognition model.

As the data are simplified, influence between different vertical domains is reduced to the minimum, data among the vertical domains can be intercommunicated and shared, the data labeling cost is reduced, and the first recognition model for cross-vertical domain semantic parsing is easier to train. The accuracy of converting the coarse-grained first recognition result into the fine-grained specific intentions and the fine-grained second entity recognition result in the target vertical domain is extremely high, and it is guaranteed that a result obtained through the first recognition model does not affect the system accuracy.

Other implementation improvements of the present disclosure will be apparent to those skilled in the art from consideration of the specification and practice of the disclosure herein. The application is intended to cover any variations, uses or adaptations of the disclosure following the general principles thereof and including such departures from the disclosure as come within known or customary practice in the art. It is intended that the specification and examples be considered as examples only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for semantic parsing, performed by an intelligent Q&A system based on a neural network, comprising:

obtaining a first recognition result of a target statement by a recognition at a coarse-grained level, wherein the first recognition result comprises a first intention recognition result and a first entity recognition result, and wherein the first entity recognition result corresponds to a plurality of vertical domains, each of the plurality of vertical domains comprises respective slots and respective intentions, the first entity recognition result includes at least one first slot and corresponding slot information, and wherein the first intention recognition result is a coarse-grained intention recognition result, the first entity recognition result is a coarse-grained entity recognition result;

determining one of the plurality of vertical domains corresponding to the first entity recognition result as a target vertical domain corresponding to the target statement according to the first intention recognition result, wherein the target vertical domain includes at least one second slot;

converting the first entity recognition result into a second entity recognition result in the target vertical domain, wherein the second entity recognition result is a fine-grained entity recognition result;

parsing a fine-grained intention of the target statement according to the second entity recognition result; and generating and outputting a query statement for the target statement according to the second entity recognition result in the target vertical domain and the fine-grained intention of the target statement, to implement intelligent voice interaction, wherein the method for semantic parsing further comprises:

establishing, before obtaining the first recognition result of the target statement, at least one first slot and a first intention corresponding to the at least one first slot, wherein the at least one first slot is established based on commonality of part of the second slots in all the vertical domains, so that different second slots in different vertical domains are mapped onto one first slot;

performing mapping of the target vertical domain to the first slots and establishing an association relationship between second slots and the first slots in the target vertical domain, wherein each of the second slots corresponds to one first slot, wherein each of the first slots corresponds to at least one second slot, and wherein a total quantity of the first slots is smaller than or equal to that of the second slots; and associating the target vertical domain to the first intention, wherein a plurality of the first intentions are defined, each of the first intentions points to one or more of the vertical domains, and after the first intentions are determined, the target vertical domain is determined according to vertical domains to which the first intentions point;

wherein the first entity recognition result comprises an entity recognition result of at least one first slot, and wherein converting the first entity recognition result into the second entity recognition result in the target vertical domain comprises:

obtaining a corresponding relation between all the second slots and the first slots in the target vertical domain; and determining an entity recognition result of the corresponding second slots according to the entity recognition result of the first slots so as to generate the second entity recognition result in the target vertical domain.

2. The method according to claim 1, further comprising:
generating training samples according to the first slots and the first intention, wherein the training samples comprise positive samples and negative samples of the target vertical domain; and
training a first recognition model by using the training samples.

3. The method according to claim 2, wherein obtaining the first recognition result of the target statement comprises:
inputting the target statement into the first recognition model so as to obtain the first recognition result.

4. The method according to claim 3, further comprising:
collecting a recognition result of the first recognition model; and
adding the recognition result into the training samples.

5. The method according to claim 1, wherein parsing the fine-grained intention of the target statement according to the second entity recognition result comprises:
parsing the fine-grained intention of the target statement according to the second entity recognition result and keywords of the target statement.

6. An electronic device, applied to an intelligent Q&A system based on a neural network, comprising:
one or more processors; and
a non-transitory computer readable storage medium, configured to store instructions executable by the one or more processors; wherein the one or more processors are configured to:

obtain a first recognition result of a target statement by a recognition at a coarse-grained level, wherein the first recognition result comprises a first intention recognition result and a first entity recognition result, and wherein the first entity recognition result corresponds to a plurality of vertical domains, each of the plurality of vertical domains comprises respective slots and respective intentions, the first entity recognition result includes at least one first slot and corresponding slot information, and wherein the first intention recognition result is a coarse-grained intention recognition result, the first entity recognition result is a coarse-grained entity recognition result;

determine one of the plurality of vertical domains corresponding to the first entity recognition result as a target vertical domain corresponding to the target statement according to the first intention recognition result, wherein the target vertical domain includes at least one second slot;

convert the first entity recognition result into a second entity recognition result in the target vertical domain, wherein the second entity recognition result is a fine-grained entity recognition result;

parse a fine-grained intention of the target statement according to the second entity recognition result; and generate and output a query statement for the target statement according to the second entity recognition result in the target vertical domain and the fine-grained intention of the target statement, to implement intelligent voice interaction, wherein the one or more processors are further configured to:

establish, before obtaining the first recognition result of the target statement, at least one first slot and a first intention corresponding to the at least one first slot, wherein the at least one first slot is established based on commonality of part of the second slots in all the vertical domains, so that different second slots in different vertical domains are mapped onto one first slot;

perform mapping of the target vertical domain to the first slots and establish an association relationship between second slots and the first slots in the target vertical domain, wherein each of the second slots corresponds to one first slot, each of the first slots corresponds to at least one second slot, and a total quantity of the first slots is smaller than or equal to that of the second slots; and associate the target vertical domain to the first intention, wherein a plurality of the first intentions are defined, each of the first intentions points to one or more of the vertical domains, and after the first intentions are determined, the target vertical domain is determined according to vertical domains to which the first intentions point;

wherein the first entity recognition result comprises an entity recognition result of at least one first slot, and wherein the one or more processors configured to convert the first entity recognition result into the second entity recognition result in the target vertical domain are further configured to:

obtain a corresponding relation between all the second slots and the first slots in the target vertical domain; and determine an entity recognition result of the corresponding second slots according to the entity recognition result of the first slots so as to generate the second entity recognition result in the target vertical domain.

7. The electronic device according to claim 6, wherein the one or more processors are further configured to:

generate training samples according to the first slots and the first intention, wherein the training samples comprise positive samples and negative samples of the target vertical domain; and train a first recognition model by using the training samples.

8. The electronic device according to claim 7, wherein the one or more processors configured to obtain the first recognition result of the target statement are further configured to:

input the target statement into the first recognition model so as to obtain the first recognition result.

9. The electronic device according to claim 8, wherein the one or more processors are further configured to:

collect a recognition result of the first recognition model; and add the recognition result into the training samples.

10. The electronic device according to claim 6, wherein the one or more processors configured to parse the fine-grained intention of the target statement according to the second entity recognition are further configured to:

parse the fine-grained intention of the target statement according to the second entity recognition result and keywords of the target statement.

11. A non-transitory computer readable storage medium, applied to an intelligent Q&A system based on a neural network and having stored therein instructions, the instructions, when executed by one or more processors of the intelligent Q&A system, cause the intelligent Q&A system to perform acts comprising:

obtaining a first recognition result of a target statement by a recognition at a coarse-grained level, wherein the first recognition result comprises a first intention recognition result and a first entity recognition result, and wherein the first entity recognition result corresponds to a plurality of vertical domains, each of the plurality of vertical domains comprises respective slots and respective intentions, the first entity recognition result includes at least one first slot and corresponding slot information, and wherein the first intention recognition result is a coarse-grained intention recognition result, the first entity recognition result is a coarse-grained entity recognition result;

determining one of the plurality of vertical domains corresponding to the first entity recognition result as a target vertical domain corresponding to the target statement according to the first intention recognition result, wherein the target vertical domain includes at least one second slot;

converting the first entity recognition result into a second entity recognition result in the target vertical domain, wherein the second entity recognition result is a fine-grained entity recognition result;

parsing a fine-grained intention of the target statement according to the second entity recognition result; and generating and outputting a query statement for the target statement according to the second entity recognition result in the target vertical domain and the fine-grained intention of the target statement, to implement intelligent voice interaction, wherein the intelligent Q&A system is further caused to:

establish, before obtaining the first recognition result of the target statement, at least one first slot and a first intention corresponding to the at least one first slot, wherein the at least one first slot is established based on commonality of part of the second slots in all the vertical domains, so that different second slots in different vertical domains are mapped onto one first slot;

perform mapping of the target vertical domain to the first slots and establishing an association relationship between second slots and the first slots in the target vertical domain, wherein each of the second slots corresponds to one first slot, wherein each of the first slots corresponds to at least one second slot, and wherein a total quantity of the first slots is smaller than or equal to that of the second slots; and associate the target vertical domain to the first intention, wherein a plurality of the first intentions are defined, each of the first intentions points to one or more of the vertical domains, and after the first intentions are determined, the target vertical domain is determined according to vertical domains to which the first intentions point;

wherein the first entity recognition result comprises an entity recognition result of at least one first slot, and wherein converting the first entity recognition result into the second entity recognition result in the target vertical domain comprises:

obtaining a corresponding relation between all the second slots and the first slots in the target vertical domain; and determining an entity recognition result of the corresponding second slots according to the entity recognition result of the first slots so as to generate the second entity recognition result in the target vertical domain.

* * * * *